(12) United States Patent
Ho

(10) Patent No.: US 6,433,680 B1
(45) Date of Patent: Aug. 13, 2002

(54) LICENSE PLATE HAVING REVERSE ALARM DEVICE

(75) Inventor: Chao-Ting Ho, Hsinchu (TW)

(73) Assignee: Photic Electronics Co., Ltd., Hsinchu (TW)

(*) Notice: Subject to any disclaimer, the term of this patent is extended or adjusted under 35 U.S.C. 154(b) by 0 days.

(21) Appl. No.: 09/899,144

(22) Filed: Jul. 6, 2001

(51) Int. Cl.⁷ .................................................. B60Q 1/00
(52) U.S. Cl. ...................... 340/435; 340/436; 340/903; 180/169; 348/148
(58) Field of Search .................................. 340/435, 436, 340/901, 903, 904; 180/169; 348/118, 148; 307/10.1

(56) References Cited

U.S. PATENT DOCUMENTS

| | | | |
|---|---|---|---|
| 5,646,614 A | * 7/1997 | Abersfelder et al. | 340/932.2 |
| 5,838,228 A | * 11/1998 | Clark | 340/436 |
| 5,914,652 A | * 6/1999 | Adamo | 340/436 |
| 6,172,600 B1 | * 1/2001 | Kakinami et al. | 340/435 |

* cited by examiner

Primary Examiner—Daniel J. Wu
Assistant Examiner—Davetta W. Goins
(74) Attorney, Agent, or Firm—Rosenberg, Klein & Lee

(57) ABSTRACT

The present invention relates to a license plate having reverse alarm device, more particularly to a license plate frame comprising a reverse alarm device with reverse alarm radar and a vehicle reverse monitoring camera mechanism to improve the safety when the user reverses a motor vehicle.

4 Claims, 3 Drawing Sheets

LICENSE PLATE HAVING REVERSE ALARM DEVICE

BACKGROUND OF THE INVENTION

1. Field of the Invention

The present invention relates to a license plate having a reverse alarm device, more particularly to a license plate frame comprising a reverse alarm device with reverse alarm radar and a vehicle reverse monitoring camera mechanism to improve the practicability of the product and the safety of the user when reversing a motor vehicle.

2. Description of the Related Art

As we know that when drivers reverse their motor vehicles, they usually make use of the rear mirrors on both sides of a motor vehicle for viewing. However, the rear mirror has a limited viewing angle, and there are blind spots. These blinds spots are potential dangers during the reverse of a motor vehicle. To improve such method of reversing motor vehicles by rear mirrors, there are devices having radar installed at the rear part of a car in the market, but there are still limitations by purely using reverse radar because there is limitation in searching angle and distance, and furthermore the reverse radar is generally installed on the bumper at the rear of the car, which would be easily damaged by collision.

In view of the shortcomings of the prior art mentioned above, which are the subjects of improvements for a long time, hence the inventor of the present invention based on years of experience accumulated from the engagement in the related industry conducted extensive research to resolve the foregoing shortcomings and invented license plate having a reverse alarm device according to the present invention.

SUMMARY OF THE INVENTION

Therefore, the primary objective of the present invention is to provide a license plate having a reverse alarm device, more particularly to a license plate frame comprising a reverse alarm device with reverse alarm radar and a vehicle reverse monitoring camera mechanism to improve the practicability of the product and the safety of the user when reversing a motor vehicle.

To make it easier for our examiner to understand the objective of the invention, its structure, innovative features, and its performance, we use a preferred embodiment together with the attached drawings for the detailed description of the invention.

BRIEF DESCRIPTION OF THE DRAWINGS

Other objects, features, and advantages of the invention will become apparent from the following detailed description of the preferred but non-limiting embodiment. The description is made with reference to the accompanying drawings, in which.

DETAILED DESCRIPTION OF THE PREFERRED EMBODIMENTS

Figure 1:
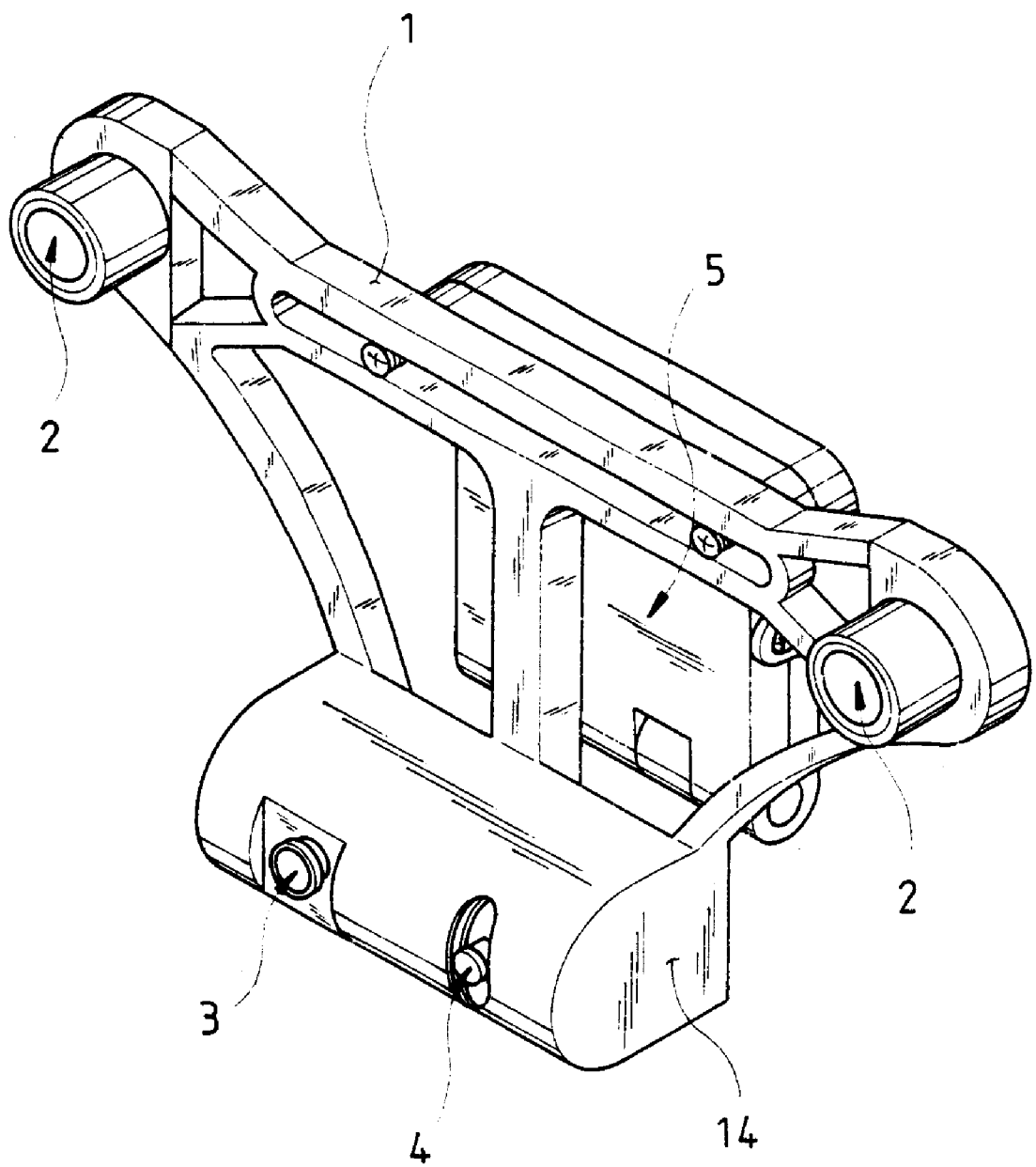
FIG. 1 shows the three-dimensional assembly structure of the present invention.
Figure 2:
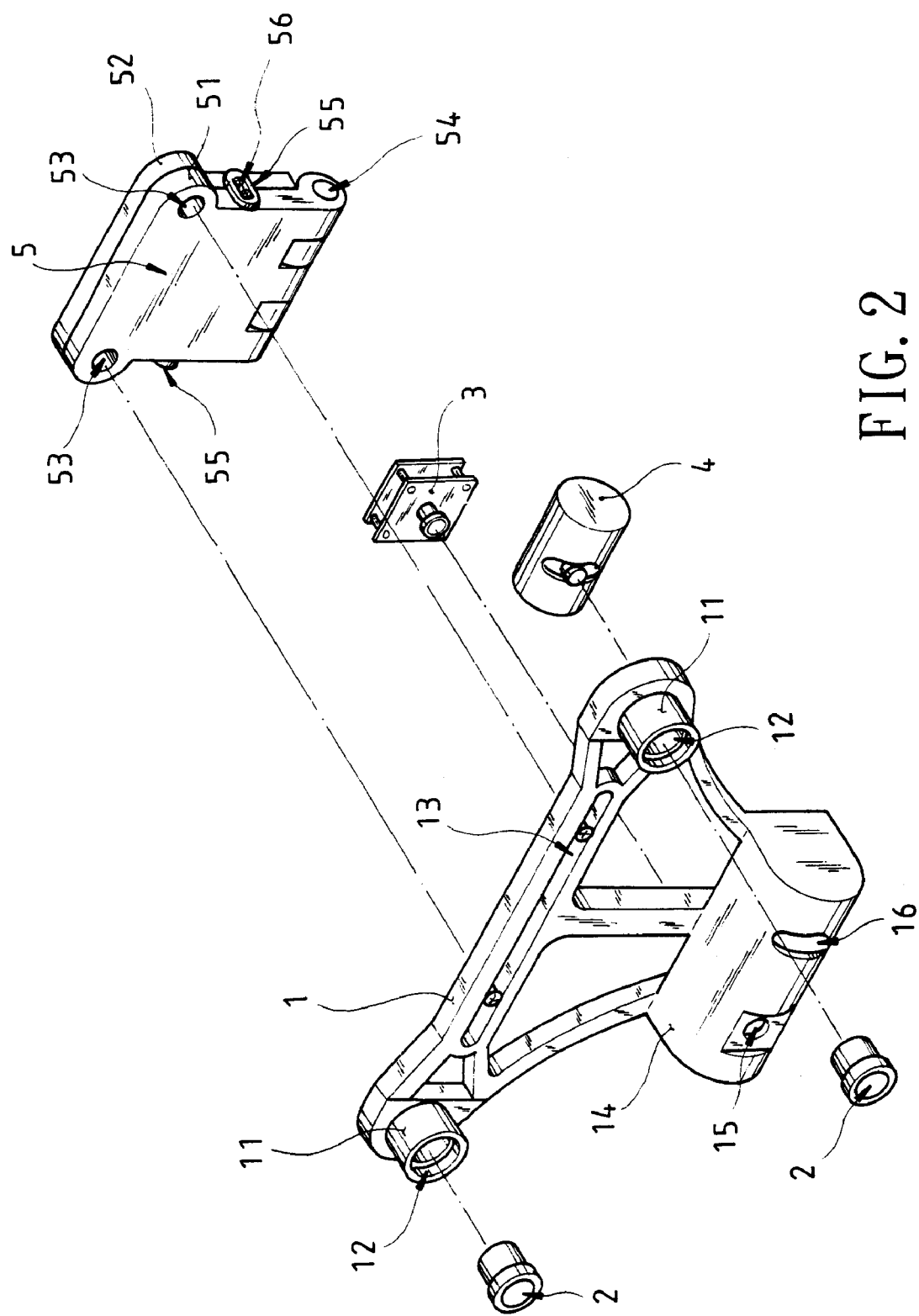
FIG. 2 shows the three-dimensional disassembled parts of the structure of the present invention.

Please refer to FIGS. 1 and 2. The license plate having a reverse alarm device comprises a license plate frame 1, a reverse radar 2, a fixed monitoring camera mechanism 3, an adjustable monitoring camera mechanism (4) and a support module 5; wherein the license plate frame 1 is a whole framework having a cylindrical support 11 protruded from both lateral ends on the upper edge of the cylindrical support 11, and the a sectional hole 12 is disposed inside the cylindrical support 11. A hollow long groove hole 13 is disposed in the middle of the upper edge of the license plate frame 1 and the lower edge of the license plate frame 1 is a hemispherical casing 14 having a hollow space in its interior, and a circular hole groove 15 is disposed at one side of the front edge of the hemispherical casing 14 and an elliptical hole groove 16 on the other side.

The reverse radar 2 is installed in the hole groove 12 of the support 11 at the upper edge on both ends of the license plate frame 1. The fixed monitoring camera mechanism 3 is installed and coupled to the hemispherical casing 14, and the camera in the front end of the fixed monitoring camera mechanism 3 is screwed onto the circular groove 15 at a lateral side of the front edge of the hemispherical casing 14. Such adjustable monitoring camera mechanism 4 is in cylindrical shape being installed to an elliptical hole groove 16 on the other side at he front edge of the hemispherical casing 14. The support module 5 comprises a license plate supporting component 51 and a car body support component 52, and the license plate support component 51 has a penetrating circular hole 53 frame on both lateral sides of the upper edge on the license plate support component 51, and the car body support component 52 also has a penetrating circular hole on the corresponding sides of the upper edge. A plurality of mutually embedded axial holes are disposed at the bottom side, and an axle 54 passes through the axial holes and can be adjusted to shift and extend to an appropriate angle. Furthermore, the support modules 5 are on the lateral sides on the edge. each having an adjusting washer 55., Two screws are used to fix the license plate support component 51 and the car body support component 52, and the support module 5 is mounted onto the license plate frame 1 by the two screws at the circular hole 53 on both lateral sides of the upper edge of the license support component 51, so that it combines into an integral license plate having a reverse alarm device.

Figure 3:
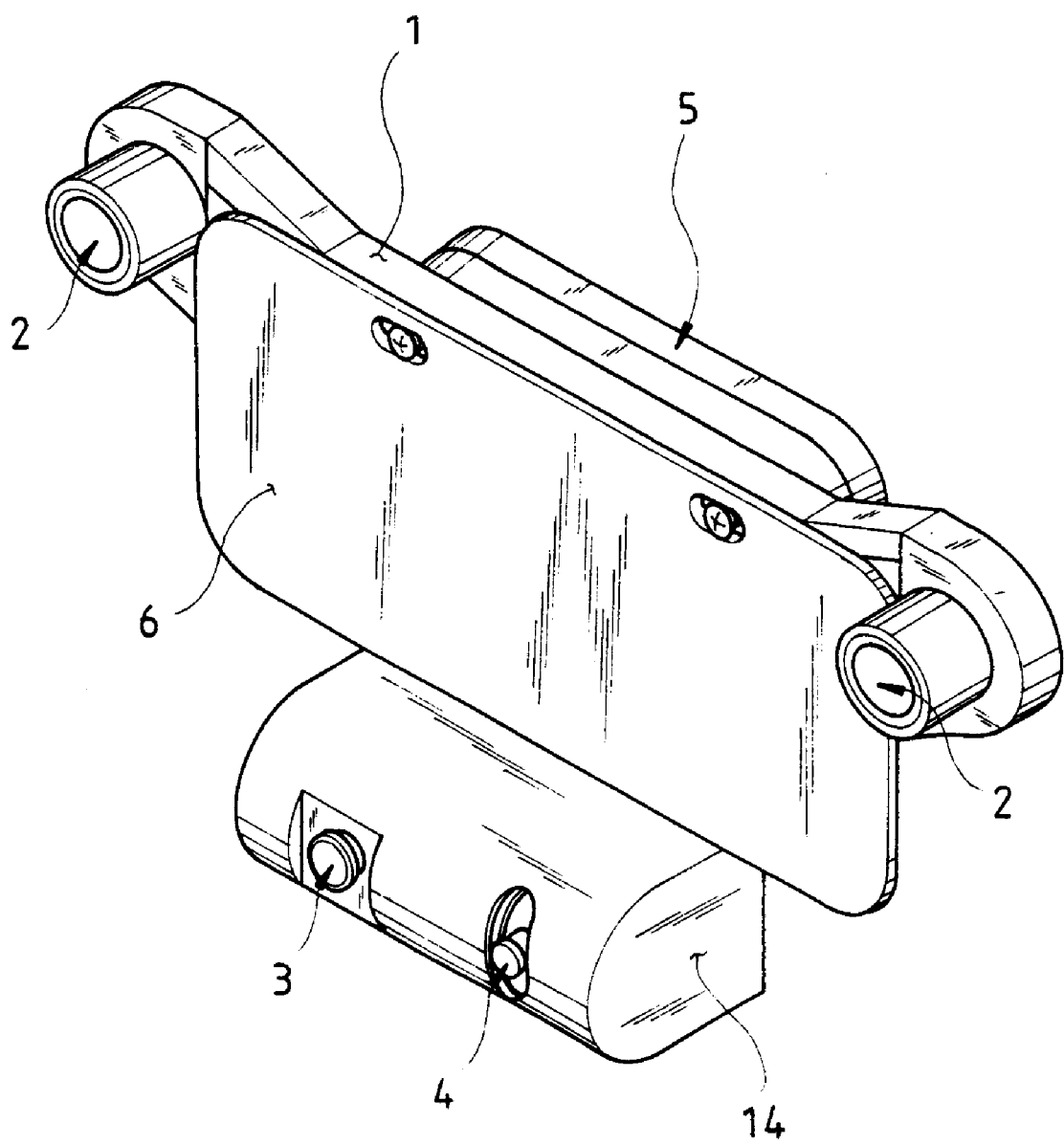
FIG. 3 is a reference diagram showing the assembly structure of the present invention when it is in use.

After the components are assembled as described above according to the present invention, please refer to FIG. 3 to mount the license plate 6 on the license plate frame 1 by screws. The support module 5 has an adjusting washer 55, and the user can install the entire module of components onto the car body by adjusting or loosening the screw 56, and then fine-tune the license plate frame 1 into an inclined angle according to the actual need. The license plate of the present invention comprises an adjustable monitoring camera mechanism 4, which allows a larger search and monitoring range. The present invention provides a frame for mounting the license plate, and also has a reverse alarm radar and a monitoring camera mechanism for the motor vehicle reverse alarm device in order to improve the safety during the reverse of a motor vehicle and the practicability of the product.

In summation of the above description, the present invention herein enhances the performance than the conventional structure and further complies with the patent application requirements and is submitted to the Patent and Trademark Office for review and granting of the commensurate patent rights.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A license plate having a reverse alarm device, comprising a license plate frame, at least one reverse radar, at least one fixed monitoring camera mechanism, at least one adjustable monitoring camera mechanism and a support module, wherein the license plate frame is a whole framework having a cylindrical support protruded from both lateral ends on the upper edge of the cylindrical support, and a sectional hole being disposed inside the cylindrical support; a hollow long groove hole being disposed in the middle of the upper edge of the license plate frame, and the lower edge of the license plate frame being a hemispherical casing having a hollow space in its interior, and a circular hole groove being disposed at one side of the front edge of the hemispherical casing and an elliptical hole groove on the other side;

the reverse radar being installed in the hole groove of the support at the upper edge on at least one end of the license plate frame for electromagnetic monitoring; the fixed monitoring camera mechanism being installed and coupled to the hemispherical casing, and a front end of the fixed monitoring camera mechanism being screwed onto the circular hole groove at one side of the front edge of the hemispherical casing; the adjustable monitoring camera mechanism being cylindrical in shape and installed to an elliptical hole groove on another side of the front edge of the hemispherical casing;

the support module comprising a license plate support component and a car body support component, and the license plate support component having a penetrating circular hole frame at each lateral side of the upper edge on the license plate support component, and the car body support component also having a penetrating circular hole on each corresponding side of the upper edge; a plurality of mutually embedded axial holes being disposed at a bottom side, and an axle passing through the axial holes and being adjustable to shift and extend to an appropriate angle;

the license plate support component and car body support component of the support module each having an adjusting washer at a lateral side, and two screws fixing the license plate support component and the car body support component, and the support module being mounted onto the license plate frame by two screws engaging the circular hole frames on the lateral sides of the upper edge of the license plate support component.

2. A license plate supporting apparatus comprising:

a support module including a car body support component and a license plate support component adjustably coupled to said car body support component, said license plate support component being adjustable in angular orientation relative to said car body support component;

a frame coupled to said support module, said frame including a laterally extended upper portion and a lower portion extending longitudinally therefrom, said upper portion having a pair of supports extending axially therefrom to each define a sectional hole, said supports being laterally displaced one from the other, said lower portion including a hemispherical casing having formed therethrough a circular hole groove and an elliptical hole groove;

a pair of reverse radar monitoring devices coupled respectively to said sectional holes of said supports;

a fixed camera monitoring mechanism disposed at least partially in said hemispherical casing of said frame lower portion, at least a portion of said fixed camera monitoring mechanism extending through said circular hole groove; and, an adjustable camera monitoring mechanism disposed at least partially in said hemispherical casing of said frame lower portion, at least a portion of said adjustable camera monitoring mechanism extending through said elliptical hole groove.

3. The license plate supporting apparatus as recited in claim 2 wherein said supports of said frame upper portion is substantially tubular in contour.

4. The license plate supporting apparatus as recited in claim 2 wherein said license plate support component is hingedly coupled to said car body support component of said support module along an edge portion thereof, said license plate support component being pivotally adjustable substantially about said edge portion.

* * * * *